(12) United States Patent
Vanbortel et al.

(10) Patent No.: US 11,307,811 B1
(45) Date of Patent: Apr. 19, 2022

(54) METHOD AND APPARATUS TO AUTOMATICALLY ADJUST FINISH OPTIONS FOR PRINT JOBS

(71) Applicant: Xerox Corporation, Norwalk, CT (US)

(72) Inventors: James D. Vanbortel, Rochester, NY (US); Bruce H. Smith, Webster, NY (US); Michael N. Soures, Webster, NY (US); Conner N. Smith, Webster, NY (US); Jonathan Ireland, Lancaster, PA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/131,428

(22) Filed: Dec. 22, 2020

(51) Int. Cl.
*G06F 3/12* (2006.01)

(52) U.S. Cl.
CPC .......... *G06F 3/1204* (2013.01); *G06F 3/1254* (2013.01)

(58) Field of Classification Search
None
See application file for complete search history.

(56) References Cited

U.S. PATENT DOCUMENTS

| 8,050,586 B2 | 11/2011 | Hoshino et al. | |
|---|---|---|---|
| 2009/0257772 A1* | 10/2009 | Hoshino | G03G 15/502 399/81 |
| 2019/0099974 A1* | 4/2019 | Shin | B65H 45/28 |
| 2019/0116292 A1* | 4/2019 | Fujiki | H04N 1/00639 |
| 2021/0072937 A1* | 3/2021 | Cruz | H04N 1/00517 |

\* cited by examiner

*Primary Examiner* — Frantz Bataille

(57) ABSTRACT

A method is disclosed. For example, the method includes receiving, by a processor of a multi-function device (MFD), a scanned image of a print job with a finish option applied to the print job, determining, by the processor, that the finish option requires an adjustment based on an analysis of the scanned image, determining, by the processor, an amount of adjustment to the finish option to apply to subsequent copies of the print job, and performing, by the processor, an adjustment to the MFD to apply the amount of adjustment to the finish option for subsequent copies of the print job.

20 Claims, 7 Drawing Sheets

METHOD AND APPARATUS TO AUTOMATICALLY ADJUST FINISH OPTIONS FOR PRINT JOBS

The present disclosure relates generally to multi-function devices (MFDs), and relates more particularly to MFDs that automatically adjust finish options for print jobs.

BACKGROUND

Multi-function devices (MFDs) are used to process print jobs. An MFD can perform a variety of different functions including printing, scanning, copying, faxing, and the like.

The MFD may include finishing options for print jobs. For example, finishing options may include stapling, folding, collating, stacking, hole punching, and the like. Different print jobs with different types of paper and different sized stacks can cause variations in the quality of the finishing option.

SUMMARY

According to aspects illustrated herein, there are provided a method and a non-transitory computer readable medium for automatically adjusting a finish option for a print job. One disclosed feature of the embodiments is a method, executed by a processor of the MFD, that comprises receiving a scanned image of a print job with a finish option applied to the print job, determining that the finish option requires an adjustment based on an analysis of the scanned image, determining an amount of adjustment to the finish option to apply to subsequent copies of the print job, and performing an adjustment to the MFD to apply the amount of adjustment to the finish option for subsequent copies of the print job.

Another disclosed feature of the embodiments is a non-transitory computer-readable medium having stored thereon a plurality of instructions, the plurality of instructions including instructions which, when executed by a processor, cause the processor to perform operations to receive a scanned image of a print job with a finish option applied to the print job, determine that the finish option requires an adjustment based on an analysis of the scanned image, determine an amount of adjustment to the finish option to apply to subsequent copies of the print job, and perform an adjustment to the MFD to apply the amount of adjustment to the finish option for subsequent copies of the print job.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to automatically adjust finish options for print jobs. As discussed above, an MFD may include finishing options for print jobs. For example, finishing options may include stapling, folding, collating, stacking, hole punching, and the like. Different print jobs with different types of paper and different sized stacks can cause variations in the quality of the finishing option.

However, depending on the type of paper or a size of the stack, the quality of the finish applied to the print job may require an adjustment. For example, the paper may be folded slightly off center, a staple may be slightly misplaced from a spine of a folded booklet, the staple may be skewed, and so forth. Previously, the user would perform a manual trial-and-error adjustment until the paper was folded properly or the staple was positioned correctly. This trial-and-error manual adjustment was time consuming and inefficient.

The present disclosure provides an apparatus that can automatically adjust a finish option for a print job. For example, the apparatus can detect whether a particular finishing option on a print job was correctly executed. If not, the apparatus can determine an amount of adjustment to apply and adjust the finishing option on subsequent copies of the print job accordingly.

Figure 1:
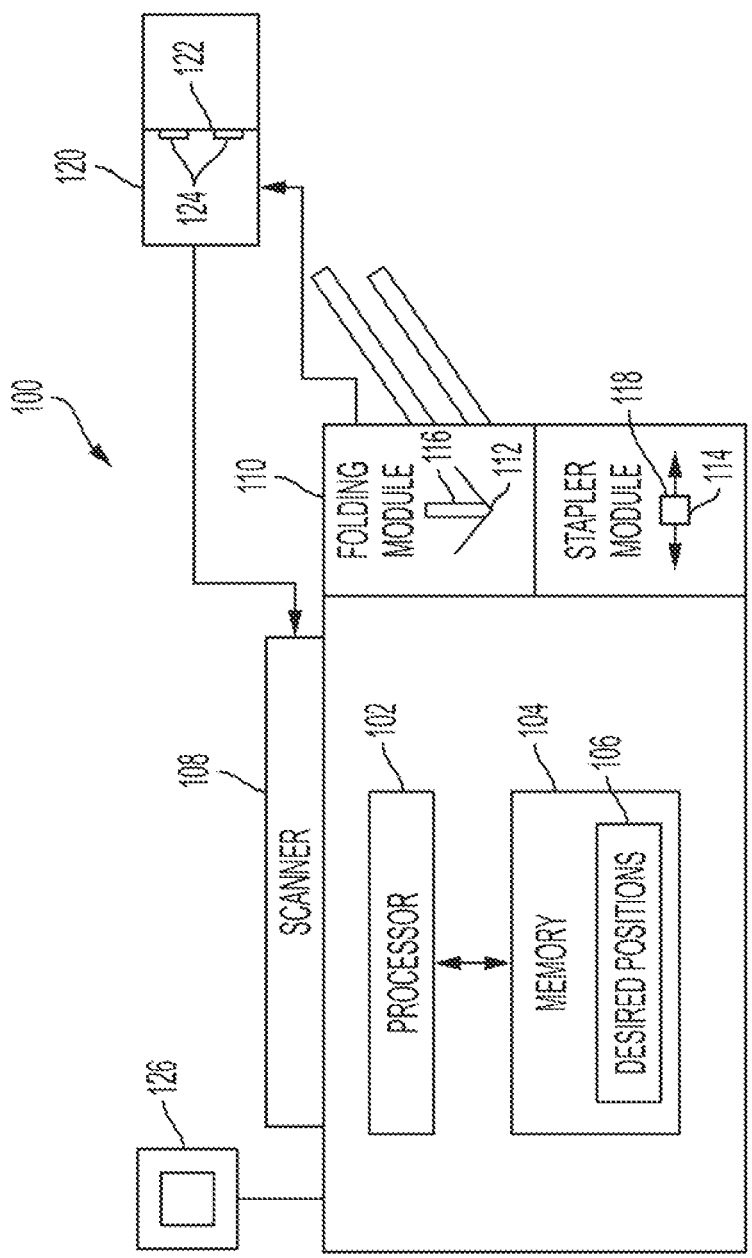
FIG. 1 illustrates a block diagram of an MFD that automatically adjusts finish options for print jobs of the present disclosure.

FIG. 1 illustrates an example MFD 100 of the present disclosure. It should be noted that FIG. 1 illustrates a simplified block diagram of the MFD 100 and may include additional components that are not shown. For example, the MFD 100 may include paper trays, a digital front end, various paper transport paths, finishing options, output trays, and the like.

In one embodiment, the MFD 100 may include a scanner 108, a finishing module 110, and user interface 126. The finishing module 110 may include different types of finishing components. For example, the finishing module 110 may include a folding module 112 and a stapler module 114. The folding module 112 may include a straight edge 116 that is used to fold printed documents. The straight edge 116 may be used to create a bi-fold, a "z" fold, and the like. The folding module 112 may include more than one straight edge 116 to perform the folding. The straight edge 116 may be mechanically adjustable to adjust the position of the straight edge 116 relative to the printed document that passes below the straight edge 116 to be folded.

In one embodiment, the stapler module 114 may include a stapler 118. The stapler 118 may be mechanically movable to adjust a position of the stapler relative to the stack of printed documents that passes below the stapler 118.

In one embodiment, the scanner 108 may include an optical scanner that can capture images of a document placed in the scanner 108. The optical scanner may be a charged coupled device (CCD) that can move across a platen glass to capture images of any documents that are placed on the platen glass.

The user interface 126 may include physical buttons or may be a touch screen that shows a graphical user interface (GUI). The user interface 126 may allow a user to select various parameters for a print job, a copy job, or scanning job.

In one embodiment, the MFD 100 may include a processor 102 and a memory 104. The processor 102 may be communicatively coupled to the memory 104, the scanner 108, the folding module 112, the stapler module 114, and the user interface 126. The processor 102 may receive inputs selected from the user interface 126 to control operation of the scanner 108, the folding module 112, and the stapler module 114.

In one embodiment, the memory 104 may be any type of non-transitory computer-readable storage medium. For example, the memory 104 may be a hard disk drive, a solid state drive, a random access memory (RAM), a read only memory (ROM), and the like. The memory 104 may store instructions that are executed by the processor 102 to perform the functions described herein.

In one embodiment, the memory 104 may store desired positions 106. The desired positions 106 may include x-y coordinates for desired positions of a fold line, a staple, a position of a staple relative to a fold line, hole punches, and the like. Detected positions of the fold line and/or staple may be compared to the desired positions 106 stored in the memory 104. If the detections positions of the fold line and/or staple are not within a tolerance threshold of the desired positions 106, then the MFD 100 may automatically make an adjustment to the paper position, the mechanical position of the straight edge 116, or the mechanical position of the stapler 118.

To illustrate, a document 120 may be printed by the MFD 100. The document 120 may receive a fold and a staple as the finishing options to form a booklet. In one embodiment, the booklet may have a bi-fold to create a fold line 122. The booklet may also be stapled at the fold line 122 with staples 124.

In one embodiment, the document 120 may be scanned by the MFD 100 to ensure that the fold line 122 and/or staples 124 are at the desired positions before subsequent copies of the document 120 are produced. Rather than performing a manual adjustment by trial and error that can be inefficient, the MFD 100 may analyze the first run of the document 120 and automatically perform a calibration of any of the modules in the finishing module 110.

In one embodiment, the document 120 may be scanned in the scanner 108. The scanned image may be received by the processor 102. The processor 102 may analyze the scanned image to detect the fold line 122 and the staples 124. The processor 102 may then determine the position of the fold line 122 and the staples 124 (e.g., the x-y coordinates). The processor 102 may then compare the position of the fold line 122 and/or staples 124 to the desired positions 106.

If the position of the fold line 122 and/or staples 124 is greater than a threshold or outside of a tolerance range, then the processor 102 may perform an adjustment to the finishing option or finishing options. The amount of adjustment may be a difference between the position of the fold line 122 and/or staples 124 and a desired position 106. For example, the processor 102 may mechanically move the straight edge 116 and/or stapler 118 by the amount of adjustment. In one embodiment, the processor 102 may adjust a paper position by adjusting a speed at which the paper moves below the straight edge 116 and/or the stapler 118. In one embodiment, the processor 102 may adjust the skew of the paper if the fold line 122 and/or staples 124 are skewed. In one embodiment, any combination of one or more of the above may be used to automatically adjust a position of the fold line 122 and/or staples 124 to be moved to the desired positions 106.

Figure 2:
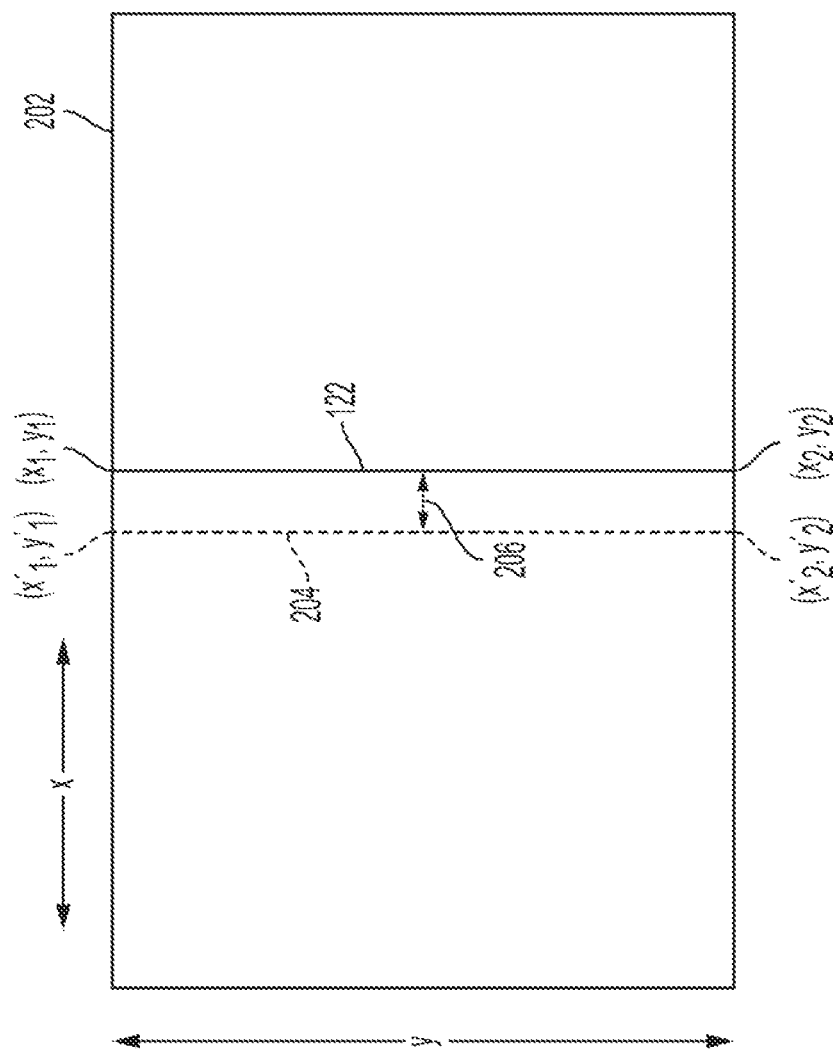
FIG. 2 illustrates an example of how a fold is detected from a scan of the present disclosure.
Figure 3:
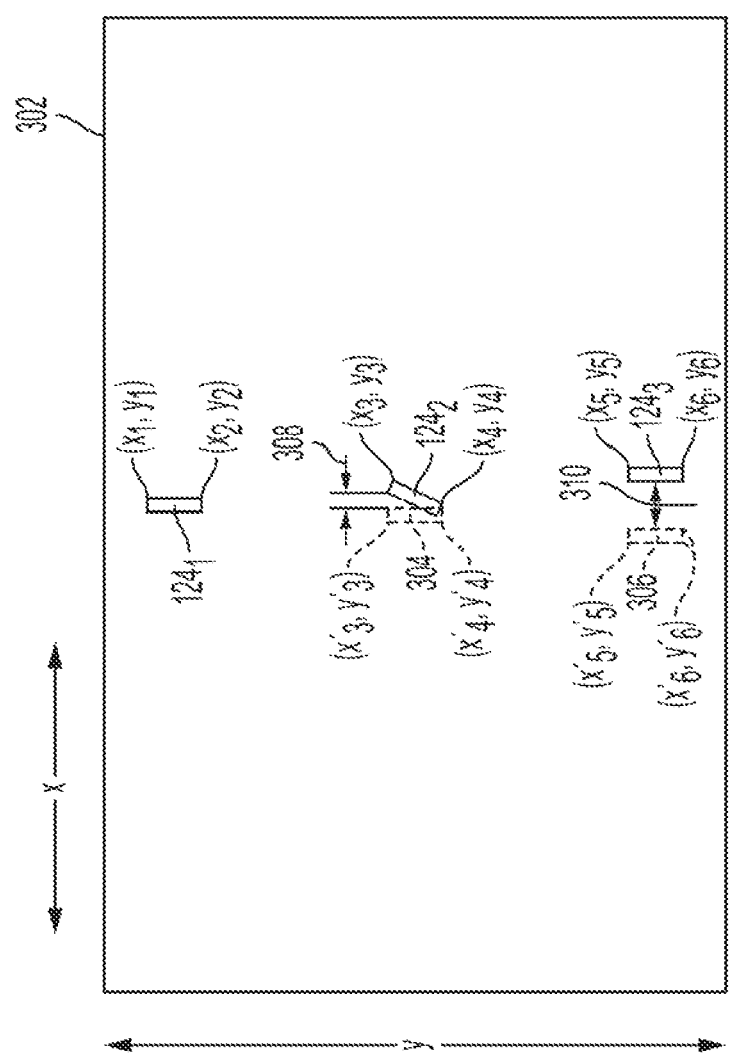
FIG. 3 illustrates an example of how a staple is detected from a scan of the present disclosure.
Figure 4:
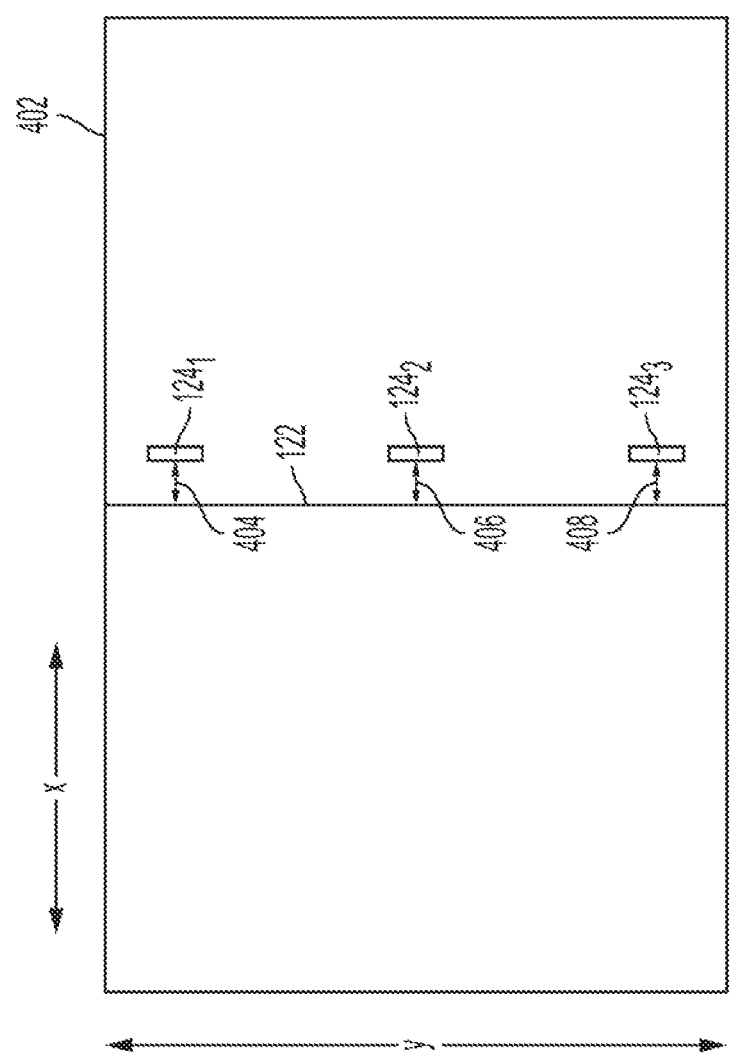
FIG. 4 illustrates an example of how a staple and a fold are detected from a scan of the present disclosure.

FIGS. 2-4 illustrate how a fold line 122 and/or staples 124 can be detected and how the position of the fold line 122 and/or staples 124 is determined. It should be noted that hole punches may be detected in a similar fashion.

FIG. 2 illustrates an example of the fold line 122 that is detected. In one embodiment, the fold line 122 may be detected from analysis of the scanned image. The fold line 122 may be detected as a black line that spans across (e.g., either length or width depending on how the document is folded) a page 202. For example, image analysis techniques can be used be the processor 102 to perform a pixel-by-pixel analysis to detect a line of dark pixels that span across the page 202.

With respect to the position of the fold line 122, the page 202 may be mapped to an x-y coordinate plane with a corner of the page 202 located at the origin of the scanner 108 having coordinates (0, 0). The fold line 122 may be detected and the position of the fold line 122 may be determined to be a position within the x-y coordinate plane. For example, the fold line 122 may have position $(x_1, y_1)$ to $(x_2, y_2)$. In other words, the fold line 122 begins at $(x_1, y_1)$ and ends at $(x_2, y_2)$ The desired position of the fold line may be represented by a dashed line 204. The amount of adjustment may be represented by a line 206. In one embodiment, the processor 102 may look up the desired position 204 as having coordinates $(x'_1, y'_1)$ to $(x'_2, y'_2)$. Thus, the amount of adjustment 206 may include a difference between $(x'_1, y'_1)$ and $(x_1, y_1)$ and a difference between $(x'_2, y'_2)$ and $(x_2, y_2)$.

In one embodiment, the processor 102 may also detect a skew in the fold line 122. For example, the fold line 122 may not be straight across the page 202. The skew may be detected based on a comparison of the two coordinates $(x_1, y_1)$ and $(x_2, y_2)$ of the fold line 122. For example, skew may be detected when $x_1$ does not equal $x_2$. The amount of adjustment for the skew may be calculated as the difference between $x_1$ and $x_2$.

FIG. 3 illustrates an example of the staples 124 that are detected. In one embodiment, the staples 124 may be detected from analysis of the scanned image. The staples 124 may be detected as a black lines of a predefined length on a page 302. For example, image analysis techniques can be used by the processor 102 to perform a pixel-by-pixel analysis to detect a line of dark pixels that have the predefined length on the page 302.

With respect to the positions of the staples 124, the page 302 may be mapped to an x-y coordinate plane with a corner of the page 302 located at the origin of the scanner 108 having coordinates (0, 0). The staples 124 may be detected and the positions of the staples 124 may be determined to be positions within the x-y coordinate plane.

For example, FIG. 3 illustrates an example with three staples $124_1$, $124_2$, and $124_3$. The staple $124_1$ may have a position $(x_1, y_1)$ and $(x_2, y_2)$. The staple $124_2$ may have a position $(x_3, y_3)$ and $(x_4, y_4)$. The staple $124_3$ may have a position $(x_5, y_5)$ and $(x_6, y_6)$. The desired positions of the staples $124_1$, $124_2$, and $124_3$ may be $(x'_1, y'_1)$ to $(x'_2, y'_2)$, $(x'_3, y'_3)$ to $(x'_4, y'_4)$, and $(x'_5, y'_5)$ to $(x'_6, y'_6)$, respectively.

In one embodiment, the staple $124_1$ may be in the desired position. Thus, dark line of the staple $124_1$ may be over the desired position such that the desired position $(x'_1, y'_1)$ to $(x'_2, y'_2)$ is not seen in FIG. 3. The desired positions of the staples $124_2$ and $124_3$ may be shown by dashed lines 304 and 306.

In one embodiment, the amount of adjustment may be represented by a gap 308 or 310. In one embodiment, the processor 102 may look up the desired positions 304 and 306 as having coordinates $(x'_3, y'_3)$ to $(x'_4, y'_4)$ and $(x'_5, y'_5)$ to $(x'_6, y'_6)$, respectively. Thus, the amount of adjustment 308 may include a difference between $(x'_3, y'_3)$ and $(x_3, y_3)$ and a difference between $(x'_4, y'_4)$ and $(x_4, y_4)$. The amount of adjustment 310 may include a difference between $(x'_5, y'_5)$ and $(x_5, y_5)$ and a difference between $(x'_6, y'_6)$ and $(x_6, y_6)$.

In one embodiment, the processor 102 may also detect a skew in the staples 124. For example, the staple $124_2$ may not be straight on the page 302. The skew may be detected based on a comparison of the two coordinates $(x_3, y_3)$ and $(x_4, y_4)$ of the staple $124_2$. For example, skew may be detected when $x_3$ does not equal $x_4$. The amount of adjustment for the skew may be calculated as the difference between $x_3$ and $x_4$.

FIG. 4 illustrates an example where the desired positions may be calculated for staples $124_1$, $124_2$, and $124_3$ relative to the folding line 122. For example, a page 402 may include the finishing options of the folding module 112 and the stapler module 114. The desired position 106 for a combination of the fold line 122 and the staples $124_1$, $124_2$, and $124_3$ may be a relative position between the fold line 122 and the staples $124_1$, $124_2$, and $124_3$ rather than an absolute value. For example, in the example illustrated in FIG. 5, the desired position 106 may be that the staples $124_1$, $124_2$, and $124_3$ are lined up on the fold line 122.

The position of the fold line 122 may be determined as described above and illustrated in FIG. 2. The positions of the staples $124_1$, $124_2$, and $124_3$ may be determined as described above and illustrated in FIG. 3. The amount of adjustment, illustrated by lines 404, 406, and 408 may be calculated by a difference in position from the staples $124_1$, $124_2$, and $124_3$ to the fold line 122. For example, the amount of adjustment may be calculated as the difference between (x, y) coordinates of each staple $124_1$, $124_2$, and $124_3$ and the (x, y) coordinates of the fold line 122.

Figure 5:
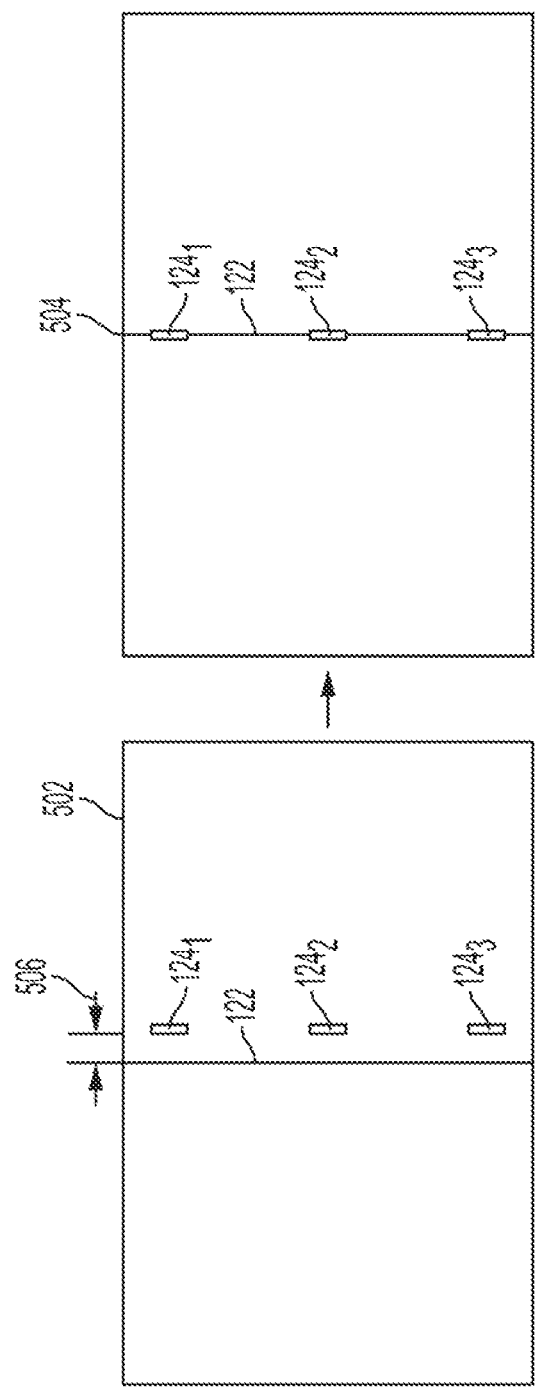
FIG. 5 illustrates a finish option on a print job before and after an adjustment of the present disclosure.

FIG. 5 illustrates examples of before and after an adjustment is performed by the MFD 100. For example, the document 502 may be produced by the MFD 100 to include a fold line 122 and the staples $124_1$, $124_2$, and $124_3$. The document 502 may be scanned by the scanner 108.

The processor 102 may analyze the scanned image to determine a position of the fold line 122 and the staples $124_1$, $124_2$, and $124_3$ as described above. The processor 102 may then determine a desired position 106 of the fold line 122 and the staples $124_1$, $124_2$, and $124_3$ from the memory 104. In one embodiment, the desired position 106 may be that the fold line 122 is in a center of the document 502 and the staples $124_1$, $124_2$, and $124_3$ are located on the fold line 122 (or also along the center of the document) and located at desired positions along the y-axis.

The processor 102 may calculate an amount of adjustment 506 between the staples $124_1$, $124_2$, and $124_3$ and the fold line 122. In the example illustrated in FIG. 5, the fold line 122 may be in the correct position. The staples $124_1$, $124_2$, and $124_3$ may be misaligned relative to the fold line 122. The amount of adjustment 506 may be calculated as a difference between the positions of the staples $124_1$, $124_2$, and $124_3$ to the fold line 122.

The processor 102 may perform the adjustments to the MFD 100. For example, the processor 102 may adjust a mechanical position of the straight edge 116 in the folding module 112, a mechanical position of the stapler 118 in the stapler module 114, adjust a position or skew of the paper when traveling through the folding module 112 and/or the stapler module 114, adjust a speed of the paper when traveling through the folding module 112 and/or the stapler module 114, and the like. For example, the straight edge 116 and the stapler 118 may be coupled to an encoded gear with a motor. The processor 102 may control operation of the motor by an amount equivalent to the amount of adjustment to move the straight edge 116 and/or the stapler 118. In another embodiment, the adjustments may be performed manually by a user or technician.

After the processor 102 performs the adjustments, subsequent copies of the document 504 may be produced. After the adjustment is performed, the subsequent copies of the document 504 may have the staplers $124_1$, $124_2$, and $124_3$ in the desired position on the fold line 122. Thus, the MFD 100 of the present disclosure may automatically analyze and adjust the positions of certain finishing options.

Figure 6:
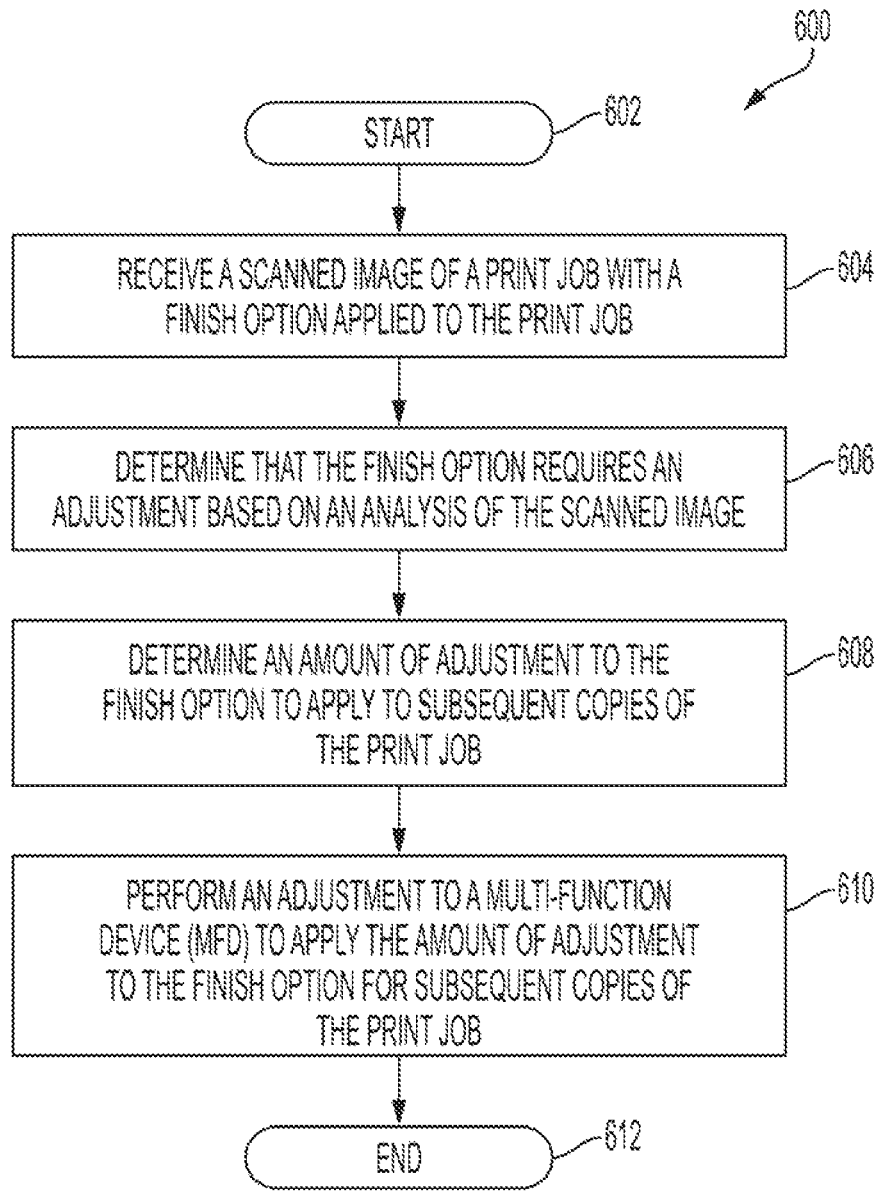
FIG. 6 illustrates an example flow chart of a method for automatically adjusting a finish option for a print job of the present disclosure.

FIG. 6 illustrates a flow chart of an example method 600 for automatically adjusting a finish option for a print job of the present disclosure. In one embodiment, the method 600 may be performed by the MFD 100 or by an apparatus, such as the apparatus 700 illustrated in FIG. 7 and discussed below.

In one embodiment, the method 600 begins at block 602. At block 604, the method 600 receives a scanned image of a print job with a finish option applied to the print job. For example, the print job may include a booklet that includes a stack of several sheets of paper. Finishing options of a bi-fold and a center staple may be applied to the print job. For example, the stack may be folded in half and one or more staples may be applied on the fold in the center of the stack of papers.

The completed print job may be placed flat on a scanner of the MFD. The print job may be scanned and an image of the print job may be captured by the scanner and provided to the processor for analysis.

At block 606, the method 600 determines that the finish option requires an adjustment based on an analysis of the scanned image. Using the example of the booklet above, when the booklet is laid flat on the scanner, the scanned image may show the fold line and the staples. The fold line may appear as a black line that runs across the center of the stack of paper. The staples may appear as dark lines of a predefined length on the paper.

The method 600 may apply image analysis techniques to analyze the scanned image pixel-by-pixel to detect the fold line and the staples. Then, the position of the fold line and the staples may be determined along an x-y coordinate plane. For example, the corner that is placed at the origin of the scanner may have coordinates of (0, 0). Then, the coordinate system may be based off of dimensions of the paper or platen glass. For example, each increment may be a millimeter, a centimeter, an inch, and so forth. For example, if millimeters is being used, the coordinates (1, 1) may refer to 1 millimeter to the right along the x-axis and 1 millimeter down along the y-axis.

In one embodiment, the position of the fold line and staples may have a pair of x-y coordinates. For example, the pair of x-y coordinates may determine a top point and bottom point of the fold line and/or staple. In addition, the pair of x-y coordinates can be used to detect a skew and an amount of skew.

In one embodiment, the position of the fold line and/or staples may be compared to a desired position for a particular finish job applied to a particular paper size. For example, a center fold on an 8.5 inch×11 inch sized paper may be at a different location than a center fold on an 11 inch×14 inch sized paper. Similarly, a center staple location may be at a different location on an 8.5 inch×11 inch sized paper than on an 11 inch×14 inch sized paper.

If the position of the fold line and/or staples is different than the desired position, then the method 600 may determine that an adjustment is required. In one embodiment, the difference may be greater than a threshold (e.g., greater than a predefined value or percentage). In one embodiment, the difference may be outside of a tolerance range (e.g., +/−a predefined value around the desired location).

At block 608, the method 600 determines an amount of adjustment to the finish option to apply to subsequent copies of the print job. For example, the amount of adjustment may be calculated as a difference in the position of the finish option to a desired position of the finish option. To illustrate, the finish option may be a fold. The fold line may be detected to be at a position $(x_1, y_1)$ and $(x_2, y_2)$. The desired position may be $(x'_1, y'_1)$ and $(x'_2, y'_2)$. Thus, the amount of adjustment may be a difference between $(x'_1, y'_1)$ and $(x_1, y_1)$ and a difference between $(x'_2, y'_2)$ and $(x_2, y_2)$.

At block 610, the method 600 performs an adjustment to the MFD to apply the amount of adjustment to the finish option for subsequent copies of the print job. In one embodiment, the adjustment may be to move a straight edge of the folding module that creates the fold line by the amount of adjustment. In one embodiment, the adjustment may be to move a stapler of a stapling module. In one embodiment, the adjustment may be to adjust a skew of the paper or a speed at which the paper moves across the folding module and/or stapling module. For example, changing the speed of the paper may alter where the paper is folded or where the staple is applied. In one embodiment, the adjustment may include any combination of moving the finishing option or changing a speed and/or skew of the paper.

In one embodiment, the method 600 may be periodically repeated. For example, for large jobs with large amounts of stacks, the position of the stacks, the position of the straight edge, the position of the stapler, and the like, can slightly move due to the repetitive use and force applied from folding and/or stapling large stacks of paper. Thus, over time the position of the finish option may move. Thus, the method 600 may be periodically repeated for large print jobs (e.g., several hundred copies of a booklet).

In one embodiment, the method 600 may be performed for each print job. For example, the first copy of a print job may be scanned and analyzed. After the finishing options are adjusted based on the analysis of the scanned image of the first copy, the subsequent copies of the print job may be completed. At block 612, the method 600 ends.

Figure 7:
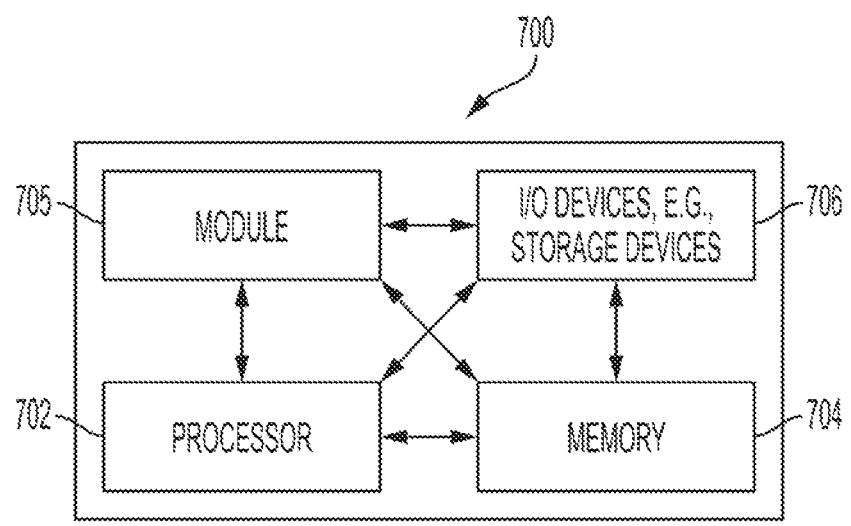
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for automatically adjusting a finish option for a print job, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for automatically adjusting a finish option for a print job (e.g., a software program comprising computer-executable instructions) can be loaded into memory 704 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for automatically adjusting a finish option for a print job (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
receiving, by a processor of a multi-function device (MFD), a scanned image of a print job with a finish option applied to the print job, wherein the finish option comprises a fold or a staple;
determining, by the processor, that the finish option requires an adjustment based on an analysis of the scanned image, wherein the adjustment comprises a skew adjustment and a x-y coordinate adjustment relative to a desired position of the fold or the staple;
determining, by the processor, an amount of adjustment to the finish option to apply to subsequent copies of the print job; and
performing, by the processor, an adjustment to the MFD to apply the amount of adjustment to the finish option for subsequent copies of the print job.

2. The method of claim 1, wherein the finish option comprises a fold.

3. The method of claim 2, wherein the analysis of the scanned image comprises:
detecting, by the processor, the fold in the scanned image;
determining, by the processor, x-y coordinates of the fold; and comparing, by the processor, the x-y coordinates of the fold to desired x-y coordinates.

4. The method of claim 3, wherein the amount of adjustment comprises a difference in the x-y coordinates of the fold and the desired x-y coordinates.

5. The method of claim 4, wherein the adjustment comprises moving a straight edge that creates the fold by the amount of adjustment.

6. The method of claim 4, wherein the adjustment comprises adjusting a speed of paper that enters a folding module of the MFD.

7. The method of claim 1, wherein the finish option comprises a staple.

8. The method of claim 7, wherein the analysis of the scanned image comprises:
   detecting, by the processor, the staple in the scanned image;
   determining, by the processor, x-y coordinates of the staple; and
   comparing, by the processor, the x-y coordinates of the staple to desired x-y coordinates.

9. The method of claim 8, wherein the amount of adjustment comprises a difference in the x-y coordinates of the staple and the desired x-y coordinates.

10. The method of claim 9, wherein the adjustment comprises moving a position of a stapler by the amount of adjustment.

11. The method of claim 9, wherein the adjustment comprises adjusting a speed or a skew of paper that enters a stapling module of the MFD.

12. A non-transitory computer-readable medium storing a plurality of instructions, which when executed by a processor of a multi-function device (MFD), causes the processor to perform operations, comprising:
   receiving a scanned image of a print job with a finish option applied to the print job, wherein the finish option comprises a fold or a staple;
   determining that the finish option requires an adjustment based on an analysis of the scanned image, wherein the adjustment comprises a skew adjustment and a x-y coordinate adjustment relative to a desired position of the fold or the staple;
   determining an amount of adjustment to the finish option to apply to subsequent copies of the print job; and
   performing an adjustment to the MFD to apply the amount of adjustment to the finish option for subsequent copies of the print job.

13. The non-transitory computer-readable medium of claim 12, wherein the finish option comprises a fold.

14. The non-transitory computer-readable medium of claim 13, wherein the analysis of the scanned image comprises:
   detecting the fold in the scanned image;
   determining x-y coordinates of the fold; and
   comparing the x-y coordinates of the fold to desired x-y coordinates.

15. The non-transitory computer-readable medium of claim 14, wherein the amount of adjustment comprises a difference in the x-y coordinates of the fold and the desired x-y coordinates.

16. The non-transitory computer-readable medium of claim 12, wherein the finish option comprises a staple.

17. The non-transitory computer-readable medium of claim 16, wherein the analysis of the scanned image comprises:
   detecting the staple in the scanned image;
   determining x-y coordinates of the staple; and
   comparing the x-y coordinates of the staple to desired x-y coordinates.

18. The non-transitory computer-readable medium of claim 17, wherein the amount of adjustment comprises a difference in the x-y coordinates of the staple and the desired x-y coordinates.

19. A method, comprising:
   receiving, by a processor a multi-function device (MFD), a scanned image of a print job with finishing options applied to the print job, wherein the finishing options comprise a bi-fold and a staple in the bi-fold;
   determining, by the processor, that the staple is misaligned with a location of the bi-fold and skewed;
   determining, by the processor, a difference between x-y coordinates of the staple and the x-y coordinates of the location of the bi-fold; and
   performing, by the processor, an adjustment to the MFD based upon the difference between the x-y coordinates of the staple and the x-y coordinates of the location of the bi-fold such that the staple is located on the location of the bi-fold for subsequent copies of the print job and the x-y coordinates of the staple to a desired position of the staple to adjust a skew of the staple.

20. The method of claim 19, wherein the adjustment comprises moving an encoded gear by controlling a motor by an amount equivalent to the adjustment to move a mechanical position of a stapler in a stapling module of the MFD by the difference between the x-y coordinates of the staple and the x-y coordinates of the location of the bi-fold.

\* \* \* \* \*